United States Patent [19]

Hoops et al.

[11] Patent Number: 4,903,249
[45] Date of Patent: Feb. 20, 1990

[54] RIGID FORAMINOUS MICROPHONE PROBE FOR ACOUSTIC MEASUREMENT IN TURBULENT FLOW

[75] Inventors: Richard H. Hoops, Stoughton; Larry J. Eriksson, Madison; Mark C. Allie, Oregon, all of Wis.

[73] Assignee: Nelson Industries, Stoughton, Wis.

[21] Appl. No.: 173,111

[22] Filed: Mar. 24, 1988

[51] Int. Cl.⁴ .............................................. H04R 23/00
[52] U.S. Cl. ..................................... 367/140; 381/71; 381/155
[58] Field of Search ................ 367/140; 381/154, 155, 381/169, 205, 71; 73/591, 592, 861.23, 861.18, 405 A, 646

[56] References Cited

U.S. PATENT DOCUMENTS

| | | | |
|---|---|---|---|
| 3,236,328 | 2/1966 | Burroughs | 381/169 |
| 3,662,124 | 5/1972 | Hassler et al. | 381/169 |
| 3,963,881 | 6/1976 | Fraim et al. | 381/155 |
| 4,677,677 | 6/1987 | Eriksson | 381/71 |
| 4,811,309 | 3/1989 | Eriksson et al. | 367/140 |

OTHER PUBLICATIONS

"Noise-Con 87", Pennsylvania State University, Jun. 8-10, 1987 Experimental Investigation for Detection of Sound-Pressure Level by a Microphone in an Airstream, Journal of the Acoustical Society of America, vol. 50, pp. 40-46, 1972.
"Theoretical and Experimental Investigations of Microphone Probes For Sound Measurements in Turbulent Flow", W. Neise, Journal of Sound and Vibration (1975) pp. 371-400.
"Measuring Microphones, Studio Microphones, Hydrophones and Accessory Equipment", UA 0436, Group 3.
Porex Porous Plastics Materials, Porex Technologies.
Porex Porous Plastic Products, Porex Technologies.
Porex S40C Porous Plastic Tubes, Porex Technologies.

Primary Examiner—Harold J. Tudor
Assistant Examiner—J. Woodrow Eldred
Attorney, Agent, or Firm—Andrus, Sceales, Starke & Sawall

[57] ABSTRACT

A microphone probe for acoustic measurement in turbulent flow. The probe includes a tube having a closed end facing upstream with respect to the direction of sound propagation and a microphone is located in a downstream end of the tube. At least a portion of the length of the tube is composed of a rigid foraminous material containing a multiplicity of interconnected cells with the average cell size being less than 100 microns. In operation sound pressure fluctuations cause pressure waves to propagate through the cells to the inside of the tube and the sound pressure waves add constructively to create a high pressure sound at the microphone, while turbulent flow pressure fluctuations are essentially averaged out.

14 Claims, 2 Drawing Sheets

RIGID FORAMINOUS MICROPHONE PROBE FOR ACOUSTIC MEASUREMENT IN TURBULENT FLOW

BACKGROUND OF THE INVENTION

Sound energy emitted by sound sources, such as centrifugal or axial flow fans, is often measured through use of a microphone but the measurement is often complicated because of the present of flow noise.

Flow noise can be generated by two sources. First, there is self-noise caused by the presence of the microphone unit itself. Microphone nose cones and wind screens can act to reduce this self-noise. Second, there is flow noise associated with the turbulent pressure fluctuations caused by the fan. Probe tubes have been proposed in an attempt to desensitize the microphones to turbulent flow pressure fluctuations. In general, the microphone probes, as used in the past, have consisted of an elongated tube having a tapered end facing upstream of the direction of sound propagation and containing a microphone in the opposite end. The tube includes a plurality of small spaced openings, or alternately, an elongated slit, which is covered with an acoustically resistive material, such as cloth or felt. Screens of this type are designed to distinguish between turbulent pressure fluctuations, which have a low propagation velocity, and sound pressure fluctuations, which have a much higher propagation velocity. Pressure fluctuations at locations on the tube cause pressure waves to propagate inside the tube with the propagation velocity being nearly equal to the speed of sound. If the pressure fluctuations are sound waves, the pressure waves from all locations will add constructively and create a high sound pressure at the microphone because the propagation velocity of the sound inside and outside of the tube is nearly the same.

On the other hand, if the pressure fluctuations are caused by turbulent flow around the tube, the pressure waves inside the tube will add destructively, because the propagation velocity inside the tube is much higher than the propagation velocity of the turbulence outside the tube, and thus only a small pressure will therefore be created at the microphone diaphragm.

However, problems have arisen with the use of conventional microphone probes. The ability of the probe to screen turbulent flow pressure fluctuations is affected by the tautness of the acoustic material which is disposed across the openings or slit in the tube. In the past, the material has been applied to the tube as a helical or spiral winding and in practice certain portions of the material may be more tightly attached than others, thereby providing a non-uniform acoustic resistance and adversely affecting performance of the instrument. Alternatively, the material has simply been held against the openings with no control over the acoustic resistance.

U.S. patent application Ser. No. 07/094,753 filed Sep. 4, 1987 is directed to an improved microphone probe in which the tube is formed with a plurality of holes or ports and acoustically resistive material is stretched across the holes and clamped to the tube. With the construction of the aforementioned patent application, the acoustically resistive material is uniformly stretched across the series of holes to provide uniform acoustical resistance and the material can be readily adjusted in tautness to vary the flow resistance as desired.

SUMMARY OF THE INVENTION

The invention is directed to an improved microphone probe for acoustic measurement in turbulent flow in which at least a portion of the length of the tube is composed of a rigid foraminous material containing a multiplicity of inner connected cells. The cells have an average size of less than 100 microns and preferably in the range of about 20 to 35 microns.

The foraminous material can take the form of a synthetic or plastic material, such as high density polyethylene or polyvinylidene fluoride, or it can take the form of a sintered metal.

In operation, sound pressure fluctuations at locations on the tube cause pressure waves to propagate through the cells of the foraminous material to the inside of the tube with the propagation velocity being nearly equal to the speed of sound. The pressure waves add constructively to create a high pressure sound at the microphone. Turbulent flow fluctuations, on the other hand, create pressure waves inside the tube that add destructively, so that only a small pressure is created at the microphone so that, in effect, the turbulent flow pressure fluctuations will be essentially averaged out.

The microphone probe of the invention has improved performance over prior art types and the effects of turbulent pressure fluctuations are greatly reduced over probes using a separate acoustically resistive material.

The porous foraminous probe is an integral one piece structure which eliminates the need for a separate tube fabric and clamping mechanism as used in the past.

Since the probe does not have a slot or group of aligned holes but instead the entire tube is formed of a foraminous material, the tube has no preferred orientation about its axis and will perform well in any orientation as long as the closed end of the tube is directed at the sound source.

The microphone probe using the foraminous tube is resistant to corrosion, moisture and rotting and is suitable for use in sanitary applications, such as in medical or food handling applications.

When formed of a plastic foraminous material, the tube is light in weight, inexpensive and has high resistance to chemical corrosion.

Other objects and advantages will appear in the course of the following description.

DESCRIPTION OF THE ILLUSTRATED EMBODIMENT

Figures 1, 2:
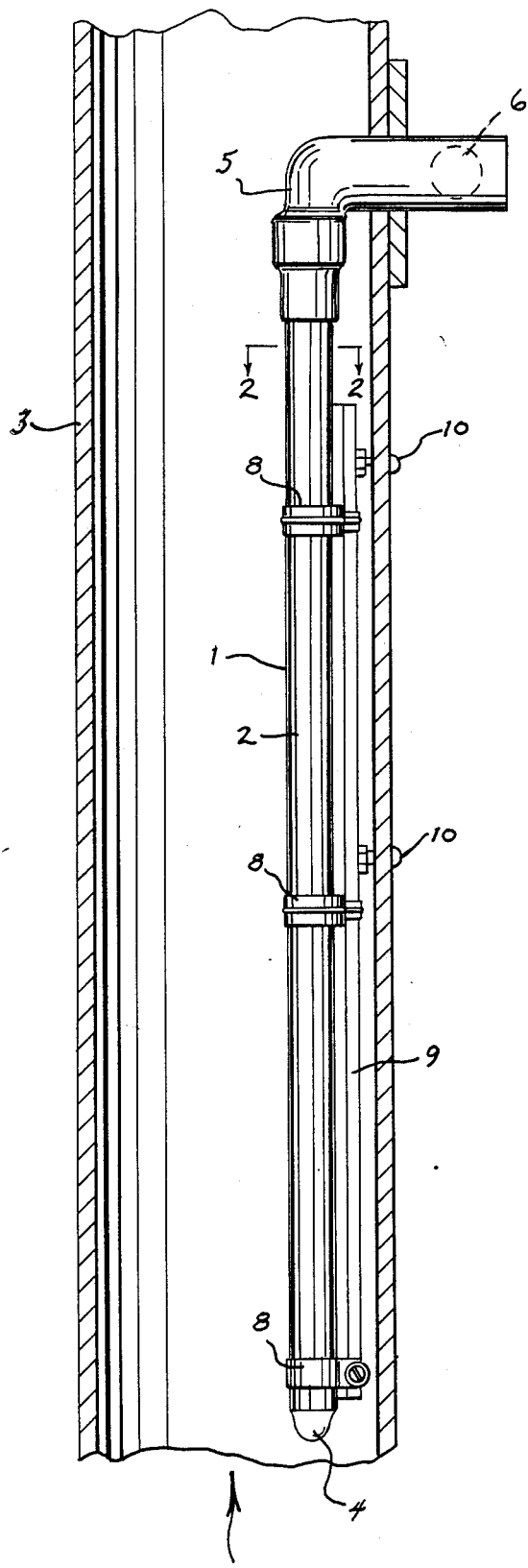
FIG. 1 is a side elevation of the microphone measuring probe of the invention as mounted in a duct.
FIG. 2 is an enlarged section taken along line 2—2 of FIG. 1.

FIG. 1 illustrates a microphone probe 1 to be used for acoustical measurement in turbulent flow. Probe 1 includes an elongated generally cylindrical foraminous tube 2 which is mounted within a duct 3 or other conduit through which the sound is propagating. While the drawings illustrate the probe 1 used in association with a duct, it is contemplated that the probe can be utilized in any fluid flow path to measure the sound energy.

The upstream end of tube 2 is enclosed by a tapered plug 4, while the downstream end is connected to an L-shaped fitting 5 which extends through an opening in duct 3. A conventional microphone 6 is located within the fitting 5 and the end of the fitting can be connected through a suitable coupling to a conduit which contains the electrical leads connected to microphone 6.

To mount the probe 1 within duct 3 a plurality of clips 8 are attached to tube 2 and the clips are removably attached to a rod 9 which extends along the wall of the duct 3. Screws 10 extend through holes in the duct and act to mount the rod to the duct. The manner of attachment of the probe to the duct is not critical and various attachment mechanisms can be utilized.

Tube 2 is formed of a foraminous rigid material having a multiplicity of interconnected cells. The foraminous material can take the form of a synthetic or plastic material such as high density polyethylene or polyvinylidene fluoride. Alternately, the tube 4 can be formed of a sintered metal, such as stainless steel. The average cell size of the foraminous tube is less than 100 microns and preferably in the range of 20 to 35 microns.

It has been found that a porous high density polyethylene sold under the trademark "POREX S40C" by Porex Technologies, Fairburn, GA is a particularly suitable material to be used as the tube 2.

In practice, the tube 2 has a wall thickness generally in the range of $\frac{1}{8}''$ to $\frac{1}{4}''$ and an O.D. of $\frac{3}{4}''$ to $2\frac{3}{4}''$.

The end plug 4 and fitting 5 are formed of non-porous material, either of plastic or metal.

During operation, sound pressure fluctuations at locations on the tube 2 cause pressure waves to propagate through the interconnected cells to the inside of the tube with the propagation velocity inside the tube being nearly equal to the speed of sound. The pressure waves within the tube add constructively to create a high sound pressure at the microphone 6.

On the other hand, turbulent flow pressure fluctuations create pressure waves inside tube 2 that add destructively so that only a minimal pressure will be created at the microphone. In effect, the turbulent flow pressure fluctuations will be averaged out.

Figure 3:
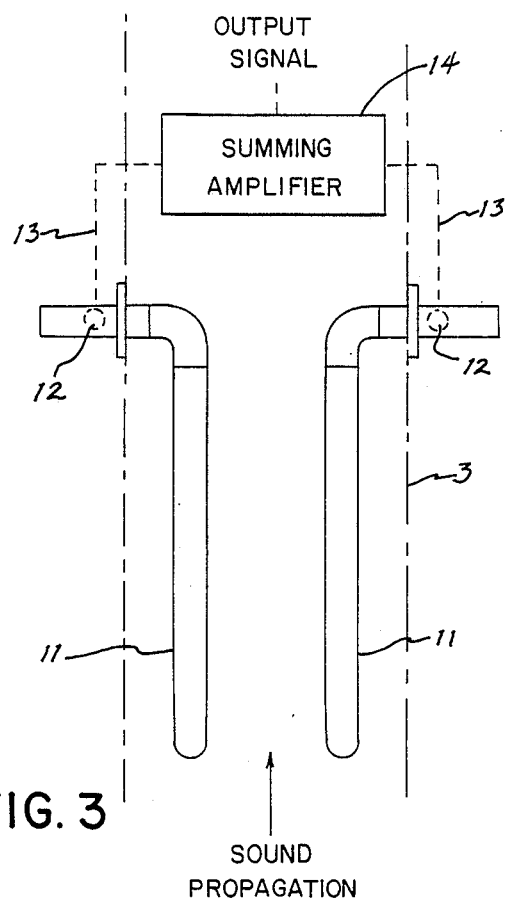
FIG. 3 is a schematic representation of a system utilizing a pair of microphone probes which are connected to a summing amplifier.

The turbulent pressure fluctuations are randomly distributed in duct 3 and to provide a more complete spatial averaging of the fluctuations, two or more probes 11 can be utilized as shown in FIG. 3. The probes 11, which can be similar in construction to probes 1 previously described, are mounted in spaced parallel relation in duct 3, preferably at diametrically opposite locations. The probes can be offset longitudinally but the offset distance should be substantially less than the wave length of the sound energy.

The microphone 12 of each probe 11 is connected by leads 13 to a summing amplifier 14 which generates a summed output signal. The use of the plurality of probes 11 provides more complete spatial averaging of the random turbulent pressure fluctuations in duct 3.

Figure 4:
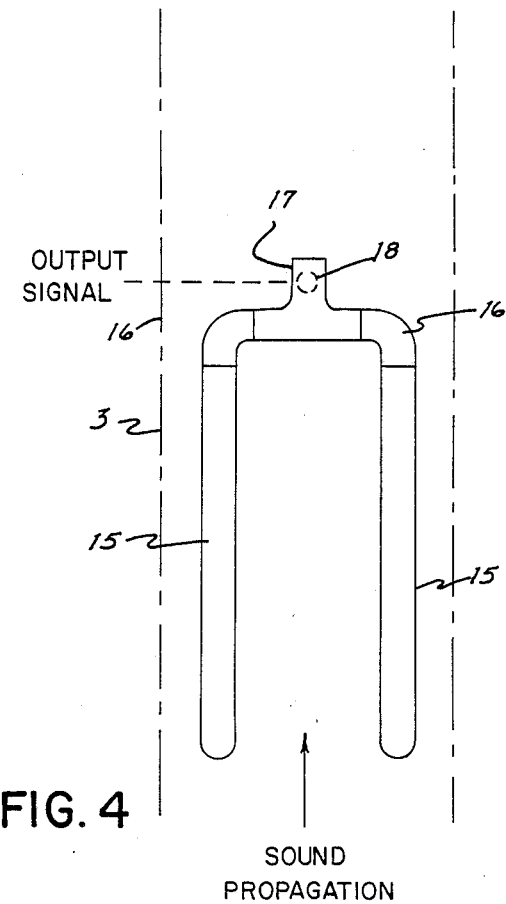
FIG. 4 is a schematic representation of a system using a plurality of probes that are joined to a single microphone.

FIG. 4 illustrates a further modified form of the invention employing a plurality of probes. In this system a pair of probes 15, similar in construction to probes 1 previously described, are positioned in spaced parallel relation in duct 3. Corresponding downstream ends of probes 15 are connected to L-shaped fitting 16 which in turn are connected to an extension 17. A single microphone 18 is located in extension 17. As in the case of the construction of FIG. 3, the system of FIG. 4 utilizing a plurality of probes 15, provides a more complete averaging of the randomly distributed turbulent pressure fluctuations in duct 3.

Figure 5:
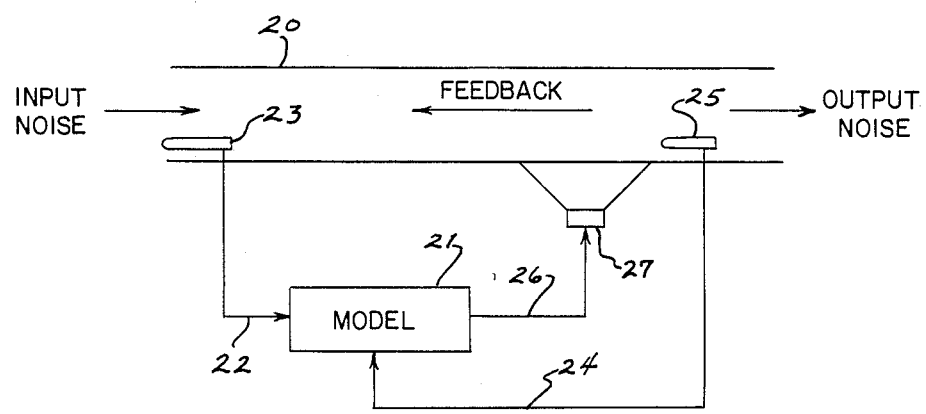
FIG. 5 is a schematic representation of a noise control system utilizing a pair of microphone probes of the invention.

FIG. 5 schematically shows the microphone probe of the invention as used in a sound attenuation system, of a type described in U.S. Pat. No. 4,677,677 and the description of that patent is incorporated herein by reference.

As shown in FIG. 5, acoustic system 20, such as a duct, is modeled with an adaptive filter model 21 having a model input 22 from input microphone probe 23, similar in construction to probe 1, an error input 24 from output microphone probe 25, also similar in construction to probe 1 and a correction signal at 26 is outputted to omnidirectional speaker or transducer 27 to introduce cancelling sound waves, such that the error signal at 24 approaches a given value such as zero.

While it is known to utilize porous or foraminous materials for muffling high frequency sound waves, typically above 1 kHz, the foraminous microphone probe of the invention does not function to attenuate sound. Instead, it is preferred that tube 2 have low attenuation. As the wall of tube 2 is relatively thin and as the frequencies involved are relatively low, i.e. typically below 1 kHz, the foraminous tube 2 functions, not to attenuate the sound, but to add the sound pressure fluctuations constructively, while adding the turbulent flow pressure of fluctuations destructively, to essentially average out the turbulent flow pressure fluctuations at the microphone.

As the foraminous material containing the interconnected cells is substantially homogeneous throughout its extent, improved performance is achieved in which the effects of the turbulent pressure fluctuations are essentially eliminated.

The microphone probe tube should always be aimed at the acoustic noise source. The turbulent flow may be in either direction. The turbulent flow pressure fluctuations will still be averaged out by the tube at the microphone.

As the interconnected cells of the foraminous material extend throughout the entire circumference of the tube, the tube has no preferred orientation which substantially simplifies the mounting of the tube to the duct.

Further, the foraminous tube eliminates the multiple piece construction as used in the past, in which the microphone probe consisted of a slotted or perforated tube, acoustic resistant material and a clamping mechanism for clamping the material across the slot or perforation. Various modes of carrying out the invention are contemplated as being within the scope of the following claims particularly pointing out and distinctly claiming the subject matter which is regarded as the invention.

We claim:

1. A microphone probe for acoustical measurement in turbulent flow, comprising a tube to be disposed in a sound field and having a closed end facing a source of sound energy, a microphone disposed in said tube downstream in the direction of sound propagation of said closed end, at least a portion of the length of said tube being composed of a rigid foraminous material containing a multiplicity of interconnected cells.

2. The probe of claim 1, wherein said material has an average cell size less than 100 microns.

3. The probe of claim 1, wherein said material has an average cell size in the range of 20 to 35 microns.

4. The probe of claim 1, wherein said material is a plastic material.

5. The probe of claim 4, wherein said plastic material is high density polyethylene.

6. The probe of claim 4, wherein said plastic material is polyvinylidene fluoride.

7. The probe of claim 1, wherein said material is a sintered metal.

8. The probe of claim 1, wherein said material extends completely around the circumference of said length.

9. In combination, means defining a flow path for sound energy, a microphone probe comprising a tube disposed in said flow path and having a closed end facing the source of sound energy, a microphone disposed in said tube downstream in the direction of sound progation of said closed end, at least a portion of the length of said tube being composed of a rigid foraminouos plastic material containing a multiplicity of interconnected cells, said cells having an average size less than 100 microns.

10. The probe of claim 9, wherein said material is high density polyethylene.

11. A microphone probe for acoustical measurement in turbulent flow, comprising a tube to be disposed in a sound field and having a closed end facing a source of sound energy, a microphone disposed in said tube downstream in the direction of sound propagation of said closed end, at least a portion of the length of said tube being composed of a rigid foraminous sintered metal containing a plurality of interconnected cells, said cells having an average size less than 100 microns.

12. The probe of claim 11, wherein said sintered metal is stainless steel.

13. The probe of claim 1, wherein said tube has a wall thickness in the range of ⅛ inch to ¼ inch.

14. In an acoustic system having an input for receiving an input acoustic wave and an output for radiating an output acoustic wave, an active attenuation system for attenuating undesirable output acoustic wave, comprising an output speaker introducing a cancelling acoustic wave; an error microphone probe for sensing the combined said output acoustic wave and said cancelling acoustic wave from said output speaker and providing an error signal, said microphone probe comprising a tube having a closed end facing said input acoustic wave, a microphone disposed in said tube downstreaam of said closed end, at least a portion of the length of said tube being composed of a rigid formaminous material containing a multiplicity of interconnected cells, and an adaptive filter model adaptively modelling said acoustic system and outputting a correction signal to said output speaker to introduce said cancelling acoustic wave.

* * * * *